United States Patent [19]
Moreno et al.

[11] Patent Number: 4,910,957
[45] Date of Patent: Mar. 27, 1990

[54] STAGED LEAN PREMIX LOW NOX HOT WALL GAS TURBINE COMBUSTOR WITH IMPROVED TURNDOWN CAPABILITY

[75] Inventors: Frederick E. Moreno, Los Altos, Calif.; Narendra D. Joshi, Phoenix, Ariz.

[73] Assignee: PruTech II, San Jose, Calif.

[21] Appl. No.: 218,253

[22] Filed: Jul. 13, 1988

[51] Int. Cl.⁴ .............................. F02C 3/14; F02C 7/22
[52] U.S. Cl. ..................................... 60/39.06; 60/737; 60/746
[58] Field of Search ..................... 60/39.03, 39.06, 737, 60/738, 746, 747

[56] References Cited
U.S. PATENT DOCUMENTS
| | | | |
|---|---|---|---|
| 4,112,676 | 9/1978 | De Carso | 60/737 |
| 4,498,288 | 2/1985 | Vogt | 60/747 |
| 4,603,548 | 8/1986 | Ishibashi et al. | 60/737 |
| 4,671,069 | 6/1987 | Sato et al. | 60/737 |

FOREIGN PATENT DOCUMENTS
| | | | |
|---|---|---|---|
| 135942 | 6/1986 | Japan | 60/746 |
| 138836 | 6/1986 | Japan | 60/746 |

*Primary Examiner*—Louis J. Casaregola
*Attorney, Agent, or Firm*—Flehr, Hohbach, Test, Albritton & Herbert

[57] ABSTRACT

In a staged lean premix low NOx gas turbine combustor, the inside of the combustor is lined with a low density refractory thermal insulator for maintaining the hot face of the lining at or near the flame temperature, i.e., within 200° F. and preferably within 50° F. The heat release value in the first stage is held at a maximum value consistent with low NOx emission while decreasing the heat release value in the second or third stage to achieve a wide range of turndown. The flame temperature in the respective stages are maintained between a low of 1700° F. and a maximum of 2700° F. The flow of compressed air into the combustor is maintained generally uniform over the entire operating range of 5 to 1 turndown.

12 Claims, 5 Drawing Sheets

FIG. 5: STAGED LEAN PREMIX COMBUSTOR

FIG. 6 : FUEL FLOW SCHEDULE FOR 3 STAGE BURNER

STAGED LEAN PREMIX LOW NOX HOT WALL GAS TURBINE COMBUSTOR WITH IMPROVED TURNDOWN CAPABILITY

BACKGROUND OF THE INVENTION

The present invention relates in general to combustors for a gas turbine and, more particularly, to a low $NO_x$, hot wall, staged lean premix combustor, preferably fired with natural gas and having improved turndown capability.

DESCRIPTION OF THE PRIOR ART

Nitrogen oxides (NOx) are a combustion-generated air pollution that can contribute to photochemical smog. NOx is formed from two combustion sources: "fuel NOx" (which arises from nitrogen in the fuel being preferentially converted to NOx) and "thermal NOx" (which is formed when high temperatures in the combustion process lead to oxygen and nitrogen in air combining to form NO). The focus of the present invention is on improvements in a method to control thermal NOx.

The preferred technique to control thermal NOx is to lower the temperature of the combustion process. Analytical and experimental work has shown that thermal NOx formation rates in flames increases sharply if local flame temperatures ("hot spots" within the flame envelope) exceed about 2800° F. Therefore, lowering the flame temperature results in reduced NOx formation.

In gas turbines (See FIG. 1), air is compressed to pressures ranging from 4 to 30 atmospheres, and then a portion is directed to one or more combustors where fuel is added and burned. The balance of the air is then mixed with the combustor discharge to produce a mixed stream having a temperature suitable for the nozzle and turbine stages of the gas turbine (temperatures typically between 1500° F. and 2300° F.). Because the air leaving the compressor and entering the combustor is at elevated temperatures (due to the heat of compression), the resulting peak flame temperature in the gas turbine combustor is high, and this leads to the formation of considerable thermal NOx even when burning clean fuels containing no nitrogen, such as natural gas.

Because gas turbines operate with high levels of "excess air" (that is, there is much more air discharged from the compressor than is needed to burn all the fuel), it is tempting to develop a strategy that uses the excess air to act as a diluent that can absorb a portion of the heat liberated by the combustion process, to reduce the peak flame temperature, and thus reduce NOx emissions. To prevent localized hot spots, the air and fuel must be thoroughly mixed prior to combustion so that there are no "fuel rich zones" (regions where the air/fuel mixture is near stoichiometric) that will result in high localized temperatures.

The amount of "leanness" with which a combustor typically operates is generally characterized by the Equivalence Ratio, ER. Equivalence Ratio divides the air/fuel ratio required for "stoichiometrically correct" combustion (combustion in which all the fuel is burned and all oxygen is consumed) by the air/fuel ratio in the combustor. Thus, if a combustor is operating with twice as much air as required to burn all the available fuel (also termed 100% excess air), the ER is 0.5. Typically, industrial combustors operate with minimum excess air to minimize stack losses, so that typical ranges in industrial applications are ER from 0.8 to 0.95 for lean premix combustors in gas turbines operating with preheated combustion air, the desired range for minimum NOx formation is Equivalence Ratio lower than 0.6.

Combustion that uses excess air mixed with the fuel prior to induction into the combustion chamber to reduce flame temperature is termed "lean premix combustion" and has been the subject of research at numerous locations.

It is known from the prior art to provide a lean premix gas turbine combustor in which fuel and air are premixed in a swirler at the end of a cylindrical metal combustion chamber and the lean premixture of fuel and air is inducted into the combustor from one end coaxially of an igniter which ignites the lean mixture. The cylindrical metal wall is cooled by being perforated having cooling members inside over which is drawn a thin film of cold air to keep the metal temperatures within acceptable ranges, (typically below 1600° F.). Such a gas turbine combustor is described in an article appearing in the 1986 International Gas Research Conference Reports, pgs. 126–139.

Figure 2:
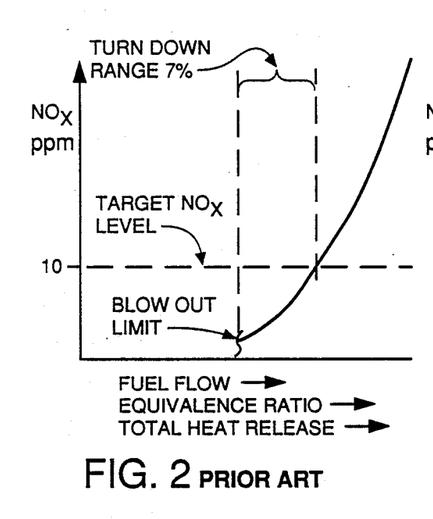
FIG. 2 is a plot of NOx emissions, in parts per million, as a function of fuel flow, Equivalence Ratio, and total heat release and depicting the turndown range of a prior art combustor.

Testing of this prior art combustor showed that low NOx emissions could be obtained, but only over a very narrow range of burner stoichiometries. As the stoichiometry was progressively leaned (more and more excess air added to the fixed fuel flow), NOx levels dropped to low levels (below 10 ppm at 15% oxygen), but further leaning resulted in "blow out" in the combustor. The flame became unstable, and combustion ceased. The range between low NOx operation and blow-out was only about 7% indicating that for this design-stable operation together with low NOx could only be obtained by operating very near the lean blow-out limit, as illustrated in FIG. 2.

The maximum turndown available with this prior art combustor is the difference between the maximum fuel flow that produces low NOx, and the minimum fuel flow that produces blow-out. Since this is only 7%, the amount of turndown is limited to 7%. Conventional gas turbines require a turndown of about 70% in order to operate over the power range from idle to full power.

Other researchers have constructed and operated lean premix gas turbine combustors with stability enhanced through the use of pilot ignition sources. The combustor system employs a plurality of burners at one end of a cooled metal wall combustion chamber all pointing axially thereof and each combining a lean premix swirled burner with a pilot burner located at the middle of the lean premix burner. One of such burners is illustrated in simplified form in FIG. 3. At full power, nearly all the fuel is directed to the lean premix combustor. As the fuel flow is reduced from maximum (that is, as the overall Equivalence Ratio is decreased), a pilot burner of conventional design is increased in intensity (heat release) to keep the overall burner combustion stable. As the lean premix burner fuel flow is decreased, the pilot fuel flow is increased.

Figure 3:
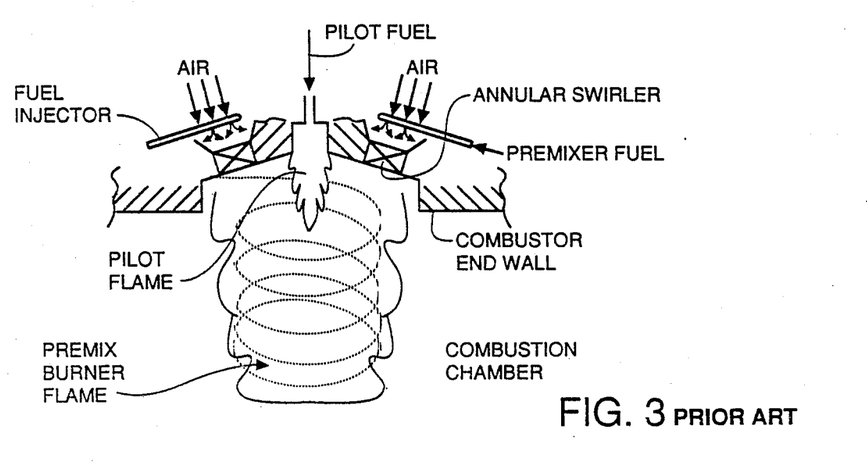
FIG. 3 is a schematic sectional view of a portion of a prior art gas turbine combustor.
Figure 4:
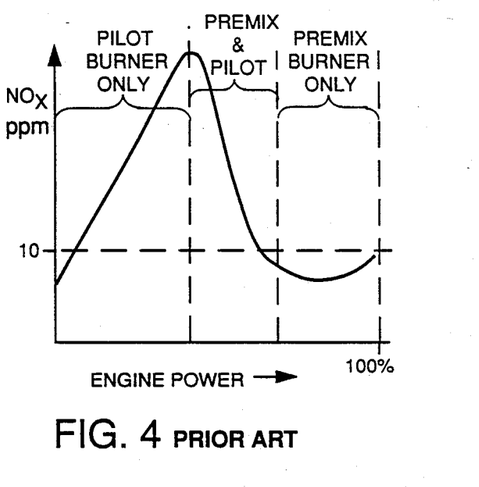
FIG. 4 is a plot of NOx emissions in parts per million vs. engine power in percent and depicting the emission characteristics for the prior art combustor of FIG. 3.

At some point, the lean premix portion of the burner can no longer be maintained in a stable combustion regime. At this point, the premix burner fuel flow is terminated, and the pilot fuel flow becomes the total fuel flow to the engine, and sustains the engine operation at reduced power settings. Because the pilot is not a low NOx design (necessary because it must operate over a wide range of heat release rates), NOx emissions increase as pilot fuel flow is increased, and the engine is unable to maintain its low NOx emissions except near full power settings. The typical NOx emissions as a function of engine power setting is illustrated in FIG. 4. This latter prior art gas turbine combustor is disclosed in a paper titled: "Premixing Gas and Air to Reduce NOx Emissions with Existing Proven Gas Turbine Combustion Chambers", presented at the International Gas Turbine Conference and Exhibit in Dusseldorf, West Germany, June 8-12, 1986 and published by the American Society of Mechanical Engineers.

It is also known from the prior art to provide a staged lean premix low NOx gas turbine combustor employing a cold combustion wall. In such a combustor, it is known to turndown the total heat release of the gas turbine combustor by holding the heat release in the first stage at its maximum value consistent with low NOx emission while decreasing the heat release in the second stage by decreasing the Equivalence Ratio of the induced lean mixture of fuel and compressed air inducted into the second stage of the combustor.

Such a combustor is described in a text titled: "Gas Turbine Combustion", published by Hemisphere Publishing Corp., 1983, pgs. 492-498. In this staged combustor, it was noted that the combustor emitted excess smoke and the turndown range was not mentioned.

It would be desirable to extend the Equivalence Ratio range over which a lean premix gas turbine combustor is operable while keeping NOx emissions acceptably low (preferably below 10 ppm corrected to 15% oxygen in the exhaust). This is equivalent to extending the operation of the gas turbine combustor over a broader range of heat releases (and, thus, a broader range of gas turbine power settings) while maintaining low NOx emissions throughout the power range.

SUMMARY OF THE PRESENT INVENTION

The principal object of the present invention is the provision of an improved low NOx gas turbine combustor having improved turndown capability.

In one feature of the present invention, a staged lean premix low NOx gas turbine combustor is provided with a thermally insulated inside wall of the combustor operating near or at the flame temperature of the combustion within the chamber, whereby the turndown capability of the combustor is improved by holding the heat release in the first stage near maximum heat release value consistent with low NOx emission while decreasing the heat release in the second stage of the combustion chamber.

In another feature of the present invention, the staged combustor is provided with a third stage and the heat release in the preceding first and second stages are held near a maximum value of heat release consistent with low NOx emission while decreasing the heat release value in the third stage.

In another feature of the present invention, the premix lean mixtures for the stages of the staged combustor have Equivalence Ratios less than 0.6.

In another feature of the present invention, the fuel employed in the combustor is natural gas consisting of a preponderance of methane.

In another feature of the present invention, the combustion temperatures in the stages of the combustion chamber are maintained between a minimum of 1700° F. and a maximum of 2700° F.

In another feature of the present invention, the lean premixture of fuel and compressed air is very thoroughly mixed before induction into the combustion stages of the staged combustor, whereby localized hot spots are avoided in operation.

In another feature of the present invention, the rates of flow of compressed air inducted into the various combustion stages of the stage combustor are held generally constant as the total heat release in the combustion chamber is turndowned over a substantial range of total heat release values.

Other features and advantages of the present invention will become apparent upon a perusal of the following specification taken in connection with the accompanying drawings wherein:

DESCRIPTION OF THE PREFERRED EMBODIMENTS

Figure 5:
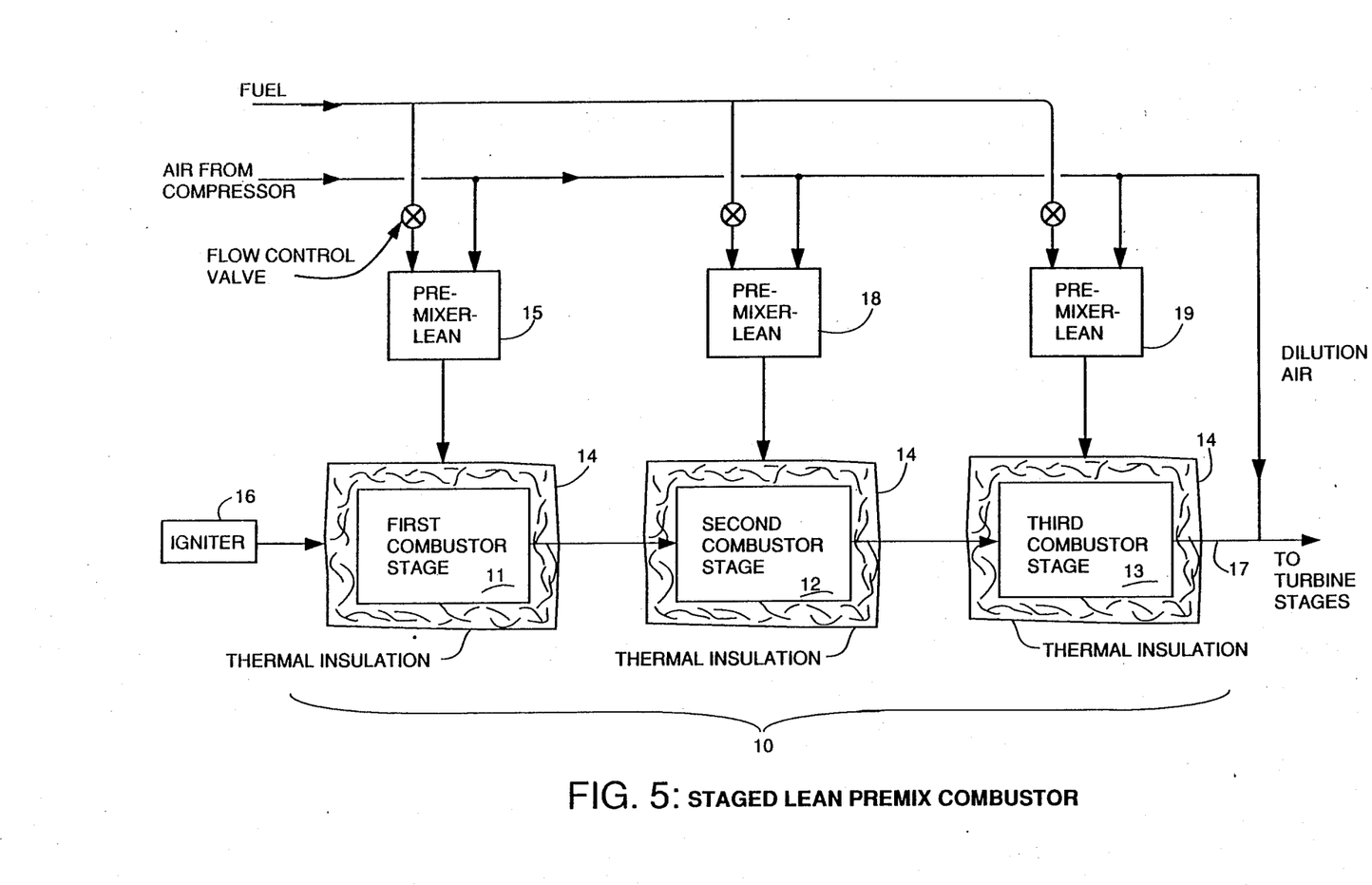
FIG. 5 is a schematic diagram, in block diagram form, of a staged lean premix gas turbine combustor incorporating features of the present invention.

Referring now to FIG. 5, the gas turbine combustor of the present invention is shown in schematic block diagram form. A series of lean premix combustion stages 11, 12 and 13 are combined to create a combustor capable of operating over the range of turndown required for gas turbine operation while producing low levels of NOx emissions over its full range of operation. While three stages are shown, any number of stages can be used to achieve the desired result. Each of the combustor stages 11, 12 and 13 is of the hot wall type, i.e., the inside wall of the combustor is thermally insulated from the support such that the inside wall operates at a temperature near the flame temperature of the combustion within the chamber or stage. In a typical example, the outside wall of the combustion chamber is made of a high-temperature stainless steel alloy such as RA3300 sheet metal, lined with a layer of refractory thermal insulation 28 of low density for maximum surface temperature. Such a hot wall provides increased turndown and stability of the flame within the combustion chamber. The refractory thermal lining 14 is preferably formed by passing a slurry of alumina and silica fibers through a screen form, the size and shape of the chamber wall, causing the fibers to be caught on the screen to form a felt-like material. In a typical example, the refractory fibers are made of alumina and silica and coated with a binding material. The felt liner is then fired to a sufficiently high temperature to bind the structure together and then it is wrapped with a thin flexible layer of fibrous thermally insulative material to allow for relative movement between the liner 14 and the outer wall of the chamber and inserted into the metallic outer wall. The result is a refractory ceramic fibrous lining approximately 1-inch thick and having approximately 90% void space. This allows refractory lining 14 to be rapidly thermally cycled with turn-off and turn-on of the combustor 10 without inducing cracking and spalling of the refractory lining 14.

Figure 1:
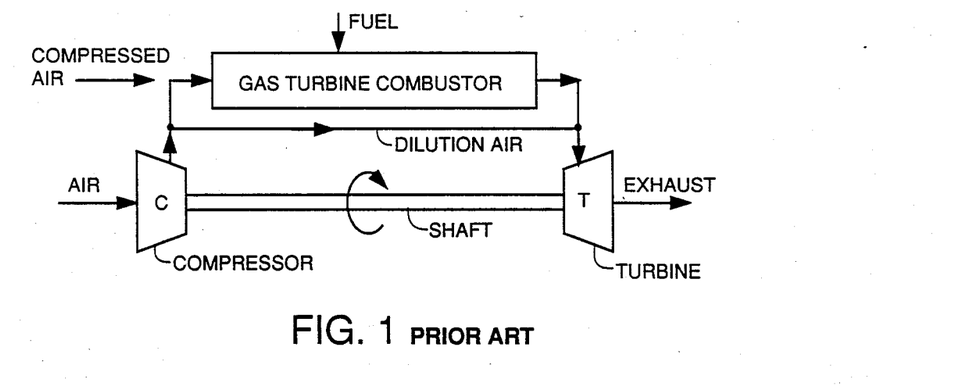
FIG. 1 is schematic line diagram, partly in block diagram form, of a prior art gas turbine.

The turbine, of the type generally described with regard to FIG. 1, is started by cranking it over with a starter to produce air flow through the compressor, combustor and turbine stages. At the appropriate speed, fuel, such as natural gas, is permitted to flow into a first stage mixer 15 which intimately mixes the air and fuel to create a uniform concentration combustible mixture that is then fed into the first combustor stage 11 where it is ignited by an igniter 16, such as a spark plug.

The first combustor stage (and all subsequent combustor stages) are lean premixed designs to minimize the formation of thermal NOx and maximize combustor stability while using lean combustible mixtures. Air flow and fuel flow are metered to the first combustor staged such that the heat release in the first combustor stage is sufficient to hold the engine at its idle speed. The temperature within and exiting the first combustor stage is near to the minimum temperature (at idle) at which stable combustion can be maintained in the first combustion stage 11. This temperature will be a function of the combustor geometry, the temperature of the combustor walls, the degree of mixing and spatial distribution of turbulence within the combustor, residence time within the combustor, and other less important features that collectively define the overall performance of the combustor including its turndown and NOx emissions. The residence time in the first stage, and all stages, is tailored to minimize carbon monoxide emissions.

The exhaust from the first combustor stage 11 flows into the second and third stages 12 and 13 where additional air is added (no fuel is added to these stages during idle conditions) and finally to the combustor exit 17 where dilution air is added prior to entering the turbine stages.

To increase the power level, (total heat release within the combustor), the fuel flow to the first combustor stage 11 is progressively increased, thereby increasing the first combustor stage exit temperature. The fuel flow to the first combustor stage 11 is increased until a maximum allowable temperature is obtained within the first stage 11. The maximum allowable temperature is that above which thermal NOx emissions become significant. The maximum allowable temperature will be approximately 2600° F., and above this temperature, formation of thermal NOx will begin to increase above negligible levels.

When the first combustor stage 11 is operating at its maximum allowable temperature i.e., not in excess of 2700° F., the air flow rate entering the second combustor stage 12 (from its respective mixer 18) is selected such that the temperature of the mixture of the flow exiting the first stage 11 and incoming from mixer 18 is the minimum required to support ignition and combustion of any amount of fuel added to the second stage mixer 18. In a typical example, this minimum allowable temperature is not below 1700° F. Thus, the first stage combustor 11 serves as an igniter for the second combustor stage 12.

Power is progressively increased by adding fuel to the second stage mixer 18, thereby raising the second stage temperature progressively toward its maximum allowable operating temperature, which will be similar to the first stage maximum allowable temperature, i.e., not in excess of 2700° F.

The flow from the second stage 12 flows to the third stage 13. The air flow through the third premixer 19 to the third stage 13 is selected such that when the second stage is at maximum allowable temperature, the temperature in the third stage is above the minimum ignition temperature needed to burn fuel added to the third mixer 19. Thus, the first and second stages combine to act as an igniter for the third stage 13.

Fuel flow to the third stage mixer 19 is then progressively increased until the maximum allowable temperature is attained in the third stage. Again, this maximum allowable temperature will be similar to the maximum allowable temperatures for the first and second stages. When this point is achieved, the fuel flow will be the maximum fuel flow, and the turbine will be producing full power (maximum heat release).

The maximum allowable exit temperature for the third stage 13 will likely be higher than allowable for the turbine stages. Therefore, the flow of dilution air is selected such that after it is blended with the combustor exhaust, the resulting temperature will be the maximum allowable inlet temperature for in the turbine stages.

Figure 6:
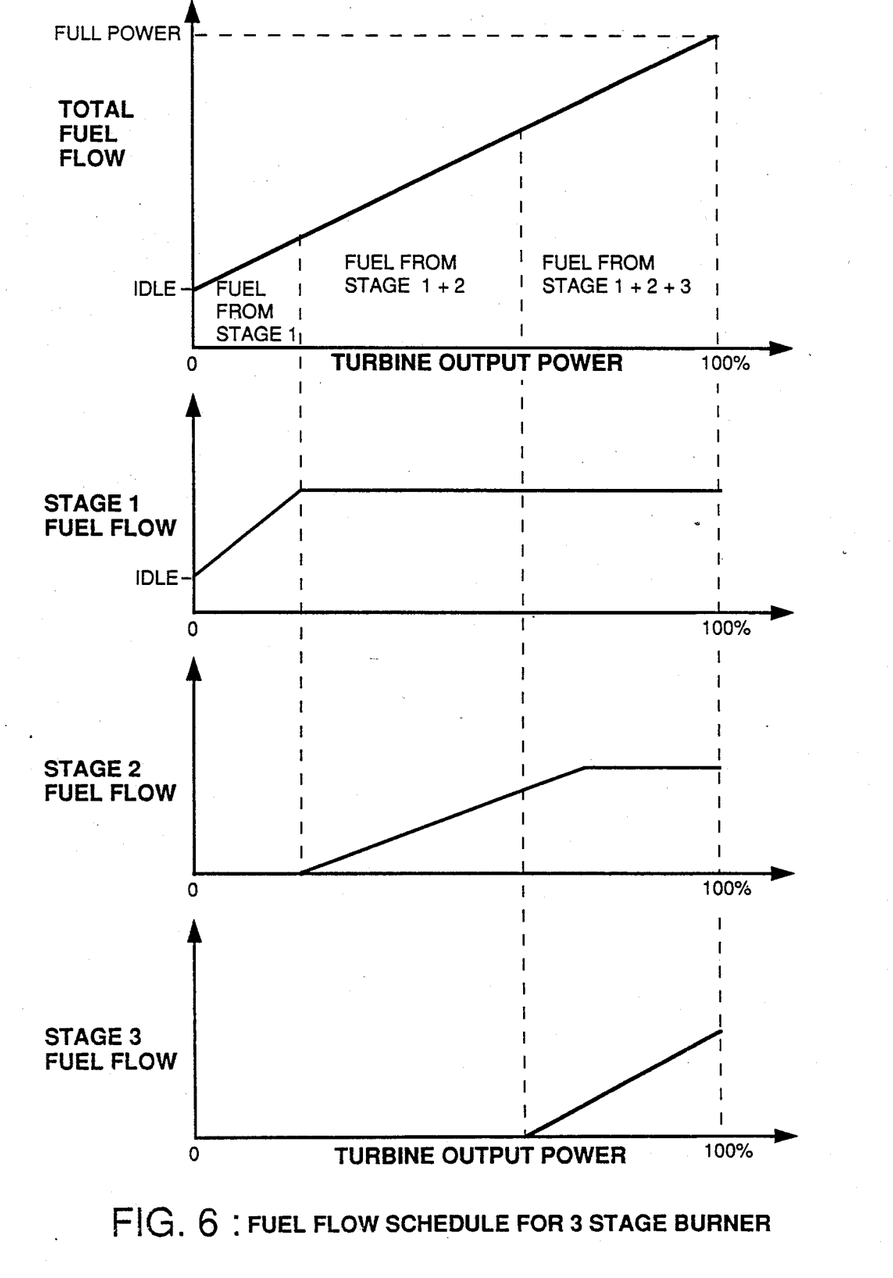
FIG. 6 is a plot of fuel flow vs. turbine output power for the gas turbine of FIG. 5 and showing the fuel consumption in the various stages of the combustor over the turndown range from 100% to idle.

The operation of the staged combustion lean premix combustor 10 is illustrated in FIG. 6 which presents the fuel flow scheduling for the lean premix combustor 10 shown in FIG. 5. At idle and low power settings, all fuel comes from the first stage premixer 15. At intermediate power settings, fuel comes from the first and second stage premixers 15 and 18. At the higher power settings, fuel comes from all three mixers 15, 18 and 19. Because each stage is constrained to operate within bounds that assure minimum production of NOx, the result is that the turbine can operate over its entire power range while producing minimal levels of NOx.

The distribution of air flow and total turndown achievable with the staged lean premix combustor 10 is a function of:

(1) mixer inlet temperature, which is equal to compressor discharge temperature on non-recuperated turbines and equal to the recuperator discharge temperature on recuperated turbines.
(2) minimum allowable combustor temperature.
(3) maximum allowable combustor temperature.
(4) desired maximum turbine inlet temperature.
(5) number of combustor stages.

As an example, if the following target parameters are selected: Compressor discharge temperature of 600° F. Minimum allowable combustor temperature of 1800° F. Maximum allowable combustor temperature of 2600° F. Maximum allowable turbine inlet temperature of 1500° F. Number of combustor stages is three.

The following are the required distribution of air flows and maximum allowable turndown: Air flow to first stage 11 of 16.2%. Air flow to second stage 12 of 10.8%. Air flow to third stage of 18.0%. Air flow to dilution stage of 55% and the allowable turndown of 21.6% of full power fuel flow.

This set of conditions produces a total turndown of nearly 5 to 1, well in excess of the 3 to 1 (33%) typically required for gas turbine operation.

Figure 7:
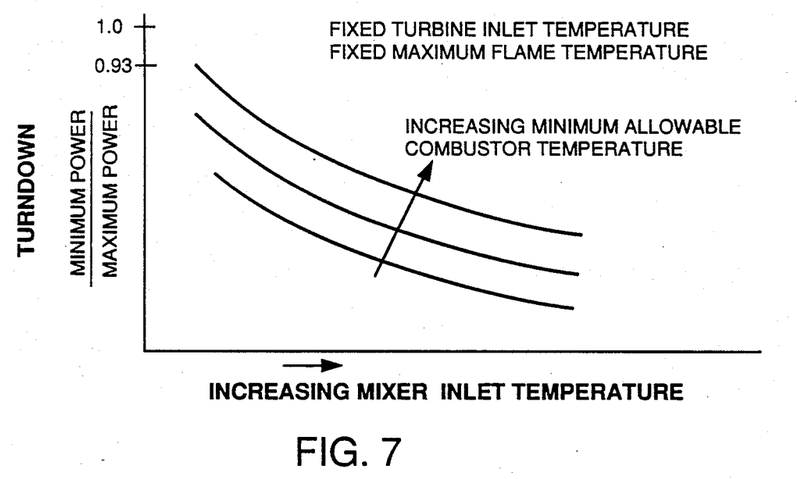
FIG. 7 is a plot of turndown vs. increasing mixer inlet temperature for three values of minimum allowable combustor temperature for the combustor of the present invention.
Figure 8:
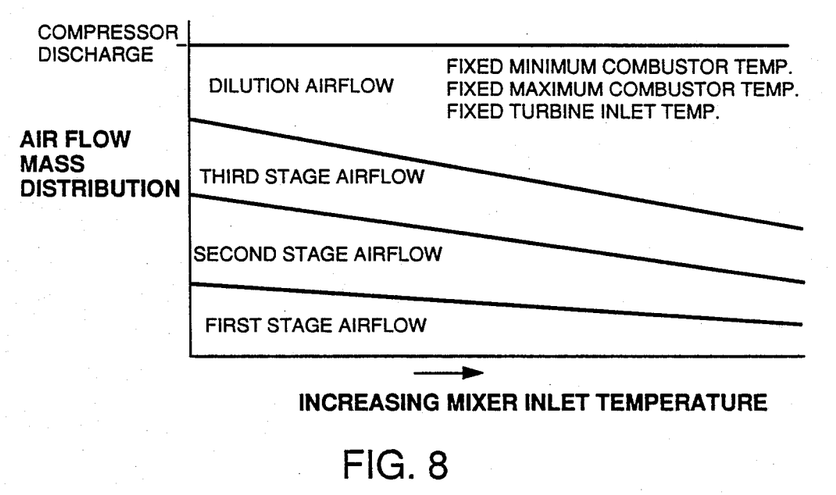
FIG. 8 is a plot of air flow mass distribution as a function of increasing mixer inlet temperature for the combustor of FIG. 5.

The relationship of the key parameters is illustrated qualitatively in FIGS. 7 and 8. FIG. 7 shows the maximum attainable turndown (defined in the figures as the ratio of the minimum attainable power from the turbine divided by the maximum attainable power from the turbine) as a function of increasing mixer inlet temperature. As the mixer inlet temperature increases (because of higher compressor discharge temperature on unrecuperated gas turbines, or higher recuperator discharge temperature on recuperated turbines), the amount of turndown achievable (for all other parameters held constant) improves. Further, as the minimum allowable combusoor temperature (generally defined as the lean blow-out temperature for each combustor stage) increases, the amount of turndown achievable decreases. Thus, it is desirable to obtain the highest possible mixer inlet temperature and minimum stable operating temperature in each combustor stage.

FIG. 8 shows how the distribution of air flow varies between combustor stages and the dilution flow as the mixer inlet temperature varies. Increasing mixer inlet temperature dictates that more and more of the flow be directed to the dilution air flow (all other parameters being held constant). Conversely, if the allowable maximum turbine inlet temperature is increased, less air will be required for diluting, and more air must flow through the various combustor stages.

Figure 9:
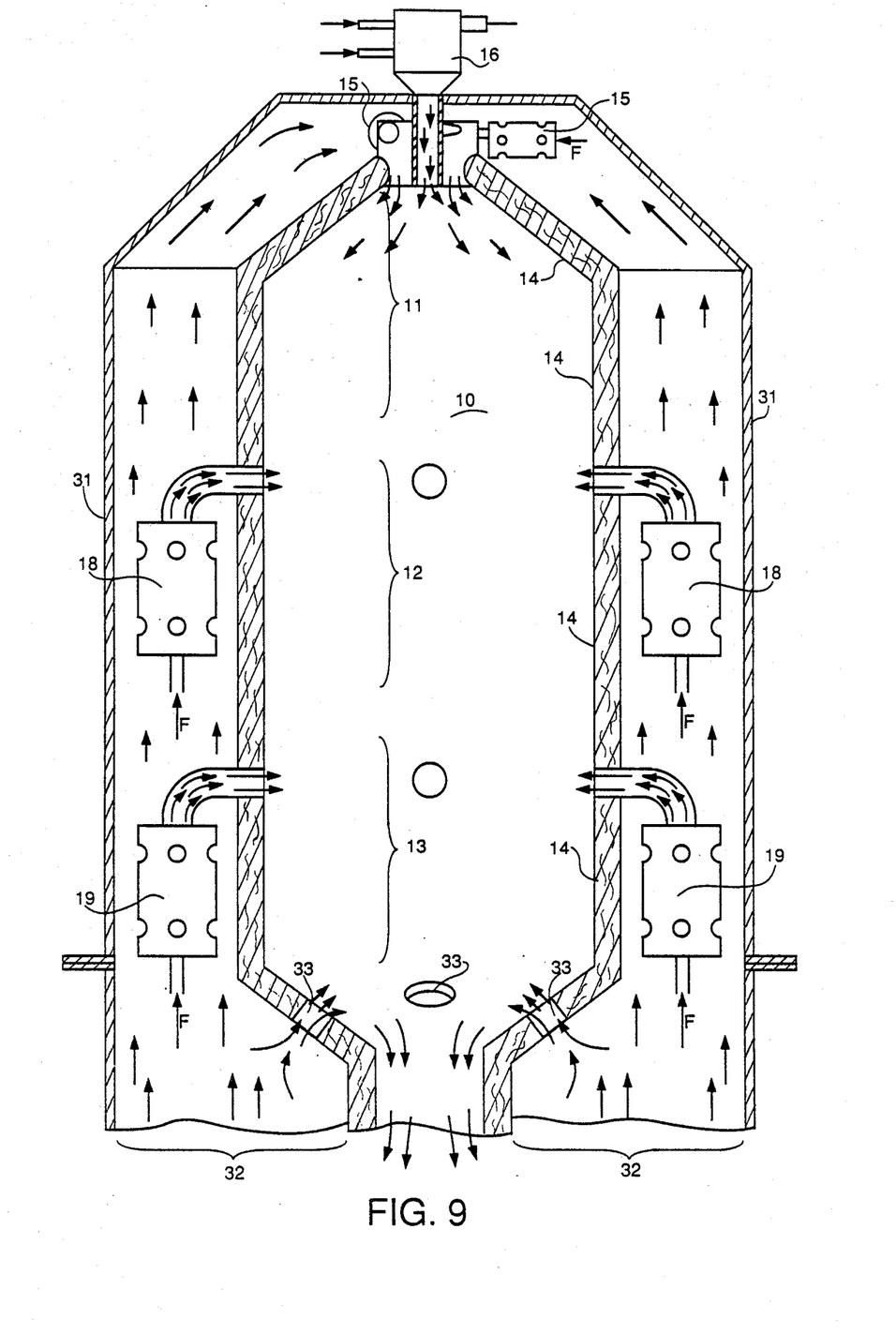
FIG. 9 is a longitudinal sectional view of a physical realization of the combustor design of FIG. 5.

Referring now to FIG. 9, there is shown a physical realization of a three-stage lean premix low NOx hot wall gas turbine combustor of the present invention. Briefly, the combustor 10 includes an outer pressure vessel 31 arranged to receive the compressed air through an annular opening 32 at the bottom end thereof. Coaxially inserted within the pressure vessel 31 is the combustion chamber 10 insulated at its interior surface with the porous fibrous refractory lining material 14 as previously described herein. The upper end of the combustion chamber 10 includes a central opening through which compressed air which fills the annulus between the combustion chamber 10 and the pressure vessel 31 enters the combustion chamber 10 from the end. A first stage premixer 15 is disposed in the annulus and is apertured to admit cnvergent streams of compressed air through the side walls to very turbulent mixing and very thorough mixing of the air with fuel inducted into the mixing chamber 15 through an end wall thereof. The thoroughly mixed fuel and air is then directed into an annular manifold tangentially to provide a swirl to the flow of air entering the end of the combustor 10. An igniter 16 is coaxilly disposed of the manifold for igniting the swirling stream of lean premixed fuel and air entering the first stage 11 of the combustor 10. Downstream of the first stage 11, there is a second stage 12 including a plurality of premixers 18 of the type previously described above with regard to 15 which thoroughly premixes the fuel and air and inducts the thoroughly mixed fuel and air into the second combustion stage 12. In a preferred embodiment, the premixed streams are inducted for head-on collision in the center of the combustor 10 to produce a stagnant region in the immediate area of the impact followed by extreme turbulent mixing as the flow diverges from the point of impact. Likewise, in the third stage 13 the premixers 19 premix the fuel and air and that mixture is inducted into the third stage 13 for head-on collision and turbulent mixing. The dilution air is inducted through ports 33.

The thermally insulative lining 14 for the combustion chamber 10 has a low coefficient of thermal conductivity such as less than 10 BTU-in./ft$^2$/°F. and preferably closer to 1 BTU-in./ft$^2$/°F. The lining 14 maintains its inside wall temperature near the flame temperature, i.e., within 200° F. and preferably within 50° F. Suitable refractory lining materials have densities on the order of 22 pounds per cubic foot.

Aside from achieving a wide range of turndown while achieving low NOx operation, a key benefit of the invention is that the desired air flow distribution is fixed by the geometry of the combustor and mixers. Thus, there is no need for "variable geometry" configurations in which the distribution of air flow is changed as the fuel flow is changed. Variable geometry requires movement of parts or opening and closing of valves that regulate the flow of the hot air flow. Such configurations are expensive, complex and prone to failure due to their complexity and the requirement to operate over a range of relatively elevated temperatures.

What is claimed is:

1. In a method for combusting fuel in a low NOx gas turbine hot wall combustor to provide improved turndown capability the steps of:
    inducting a premixed lean first mixture of fuel and compressed air into a first stage of a combustion chamber having a thermally insulated inside wall operating near the flame temperature of the combustion within the chamber;
    igniting and combusting the first mixture of fuel and air in the first stage of the combustion chamber to produce first stage combustion products exhausting from the first stage of the combustion chamber;
    inducting a premixed lean second mixture of fuel and compressed air into a second stage of the combustion chamber downstream of the first stage and into the combustion products exhausting from the first stage of the combustion chamber;
    igniting and combusting the second lean mixture of fuel and air in the second stage of the combustion chamber to produce second stage combustion products, which include the first stage combustion products, exhausting from the second stage of the combustor;
    inducting dilution compressed air into the combustion products of the combustion chamber for cooling the temperature of the combustor exhaust; and
    turning down the total heat release value of the gas turbine combustor from a first value of heat release to a second lower value of heat release by holding the heat release in the first stage of the combustion chamber generally at its maximum value of heat release consistent with low NOx emission while decreasing the heat release in the second stage of the combustion chamber by decreasing the Equivalence Ratio of the inducted lean second mixture of fuel and compressed air, whereby the turndown capability of the combustor is extended to cover a broader range of heat release values while maintaining low NOx emissions.

2. The method of claim 1 including the step of:
    further turning down the total heat release value of the gas turbine combustor from a third value of heat release where the heat release value in the second stage of the combustor is a minimum value to an idle value of total heat release by holding the heat release value in the second stage at its minimum value whiled decreasing the heat release value in the first stage of the combustion chamber by decreasing the Equivalence ratio of the inducted lean first mixture of fuel and compressed air, whereby the turndown capability of the combustor is extended to cover a broader range of heat release values while maintaining low NOx emissions.

3. The method of claim 1 wherein the premixed first and second lean mixtures both have Equivalence Ratios less than 0.6.

4. The method of claim 1 wherein the fuel is natural gas consisting of a preponderance of methane.

5. The method of claim 1 including the step of:
maintaining the combustion temperatures in both of said first and second combustor stages between the minimum to maintain stable combustion and a maximum which is below that temperature at which significant thermal NOx is produced.

6. The method of claim 1 including the step of:
maintaining the combustion temperatures in both of said first and second combustor stages between a minimum of 1700° F. and a maximum of 2700° F.

7. The method of claim 1 including the step of:
maintaining the dilution air flow rate higher than the sum of the first and second combustion stage air flow rates.

8. The method of claim 1 including the steps of:
inducting a mixed lean third mixture of fuel and compressed air into a third stage of the combustion chamber downstream of the first and second stages and into the combustion products exhausting from the second stage of the combustion chamber;
igniting and combusting the third lean mixture of fuel and air in the third stage of the combustion chamber to produce third stage combustion products, which include the first and second stage combustion products, exhausting from the third stage of the combustion chamber; and
turning down the total heat release value of the gas turbine combustor from a fourth value of heat release to a fifth lower value of heat release by holding the heat release in the first and second stages of the combustion chamber generally constant at their maximum value of heat release consistent with low NOx emission while decreasing the heat release in the third stage of the combustion chamber by decreasing the Equivalence Ratio of the inducted lean third mixture of fuel and compressed air, whereby the turndown capability of the combustor is extended to cover a broader range of heat release values while maintaining low NOx emissions.

9. The method of claim 8 including the step of:
maintaining the Equivalence Ratios of the premix second and third lean mixture below 0.06.

10. The method of claim 8 including the step of:
maintaining the combustion temperatures in said first, second and third combustion stages between a minimum of 1700° F. and a maximum of 2700° F.

11. The method of claim 1 including the step of:
maintaining the percentage rate flow of compressed air inducted into the first and second combustion stages generally constant as the total heat release in the combustion of chamber is turned-down over a substantial range of total heat release values.

12. The method of claim 10 including the step of maintaining the flow rates of compressed air into said first, second, third and dilution stages essentially constant as the total heat release in the combustor is turned down over a substantial range of total heat release values.

* * * * *